United States Patent
Lin

(10) Patent No.: US 8,021,010 B2
(45) Date of Patent: Sep. 20, 2011

(54) LIGHT-EMITTING MODULE, DIFFUSION UNIT AND DIFFUSION SHEET

(75) Inventor: Feng-Li Lin, Taishan Township, Taipei County (TW)

(73) Assignee: Gigno Technology Co., Ltd., Taipei (TW)

( * ) Notice: Subject to any disclaimer, the term of this patent is extended or adjusted under 35 U.S.C. 154(b) by 391 days.

(21) Appl. No.: 12/172,711

(22) Filed: Jul. 14, 2008

(65) Prior Publication Data

US 2009/0021935 A1   Jan. 22, 2009

(30) Foreign Application Priority Data

Jul. 16, 2007 (TW) .............................. 96125884 A

(51) Int. Cl.
*G02F 1/13357* (2006.01)
*F21V 11/00* (2006.01)

(52) U.S. Cl. ....... 362/97.1; 362/607; 362/608; 362/609; 362/217.15; 362/217.17

(58) Field of Classification Search .................. 359/599; 362/217.11, 217.15, 217.17, 97.1, 607–609
See application file for complete search history.

(56) References Cited

U.S. PATENT DOCUMENTS

| | | | | |
|---|---|---|---|---|
| 5,625,968 | A * | 5/1997 | Ashall | 40/546 |
| 6,502,945 | B2 * | 1/2003 | Kim et al. | 362/27 |
| 6,580,477 | B1 * | 6/2003 | Cho | 349/65 |
| 6,771,335 | B2 | 8/2004 | Kimura et al. | |
| 7,271,862 | B2 * | 9/2007 | Matsunaga et al. | 349/64 |
| 2008/0192180 | A1 * | 8/2008 | Baba | 349/70 |

FOREIGN PATENT DOCUMENTS

| | | |
|---|---|---|
| CN | 1534315 A | 10/2004 |
| CN | 1881029 A | 12/2006 |
| CN | 101000426 A | 8/2007 |

* cited by examiner

*Primary Examiner* — Stephen F Husar
*Assistant Examiner* — James W Cranson
(74) *Attorney, Agent, or Firm* — Birch, Stewart, Kolasch & Birch, LLP

(57) ABSTRACT

A diffusion unit of a light-emitting module is disposed adjacent to at least one light source. The light source emits a light beam. The diffusion unit includes a first diffusion sheet and a second diffusion sheet. The thickness of the first diffusion sheet is less than 1 mm, and the thickness of the second diffusion sheet is also less than 1 mm. The second diffusion sheet is disposed adjacent to the first diffusion sheet. The light beam is directly emitted from the light source directly to the first diffusion sheet. A light-emitting module and a diffusion sheet are also disclosed.

15 Claims, 8 Drawing Sheets

LIGHT-EMITTING MODULE, DIFFUSION UNIT AND DIFFUSION SHEET

CROSS REFERENCE TO RELATED APPLICATIONS

This Non-provisional application claims priority under 35 U.S.C. §119(a) on Patent Application No(s). 096125884 filed in Taiwan, Republic of China on Jul. 16, 2007, the entire contents of which are hereby incorporated by reference.

BACKGROUND OF THE INVENTION

1. Field of Invention

The invention relates to a light-emitting module, a diffusion unit and a diffusion sheet.

2. Related Art

Since the liquid crystal display (LCD) technology has been developed recently, the LCD device gradually replaces the conventional CRT (cathode-ray-tube) display device. The liquid crystal in the LCD device can not emit light by itself, so a backlight module is necessary for the backlight light source of the LCD device.

As shown in FIG. 1, a conventional backlight module 1 includes a light source 11, a back plate 12, a diffusion plate 13 and a diffusion film 14. For example, the light source 11 includes a plurality of CCFLs (cold cathode fluorescent lamps), which are separately disposed in the back plate 12. The diffusion plate 13 is disposed on the light source 11, and the diffusion film 14 is stacked on the diffusion plate 13.

As mentioned above, the diffusion plate 13 can homogenize the light emitted from the light source 11 so as to reduce the non-uniformity of the light, which is similar to the function of the diffusion film 14. In addition, since the thickness of the diffusion plate 13 is larger (about 1.5 to 2.0 mm), the diffusion plate 13 can achieve the function of supporting the diffusion film 14.

However, the thickness as well as the material cost of the diffusion plate 13 is greater than those of the diffusion film 14. In addition, the light emitted from the light source 11 may generate more energy loss after passing through the thicker diffusion plate 13, so that the brightness of the backlight module 1 is decreased.

Therefore, it is an important subject to provide a backlight module, a diffusion unit and a diffusion sheet that can reduce the material cost of the diffusion sheet and increase the brightness of the outputted light.

SUMMARY OF THE INVENTION

In view of the foregoing, the invention is to provide a backlight module, a diffusion unit and a diffusion sheet that can reduce the material cost of the diffusion unit and increase the brightness of the outputted light.

To achieve the above, the invention discloses a diffusion unit of a light-emitting module. The diffusion unit is disposed adjacent to at least one light source, which emits a light beam. The diffusion unit includes a first diffusion sheet and a second diffusion sheet. The first diffusion sheet has a thickness less than 1 mm, and the second diffusion sheet also has a thickness less than 1 mm. The second diffusion sheet is disposed adjacent to the first diffusion sheet. The light beam is directly emitted from the light source to the first diffusion sheet.

In addition, the invention also discloses a light-emitting module including at least one light source, a diffusion unit and a supporting unit. The light source emits a light beam. The diffusion unit includes a first diffusion sheet and a second diffusion sheet. The thicknesses of the first diffusion sheet and the second diffusion sheet are less than 1 mm. The second diffusion sheet is disposed adjacent to the first diffusion sheet. The light beam is directly emitted from the light source to the first diffusion sheet. The supporting unit supports the diffusion unit.

Moreover, the invention further discloses a diffusion sheet including a substrate and a diffusion material. The diffusion material has at least one high-density area and at least one low-density area.

As mentioned above, the invention utilizes one or two diffusion sheets with the thickness less than 1 mm to form the diffusion unit. In addition, a supporting unit without the optical property is used to support the diffusion unit so as to keep the diffusion unit planar. Compared with the prior art, the invention uses the thinner diffusion sheet to form the diffusion unit, so that the material cost can be reduced. Moreover, the energy loss of the light beam after passing through the diffusion unit of the invention can be decreased, so that the brightness of the outputted light of the light-emitting module can be increased.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

First Embodiment

Figure 1:
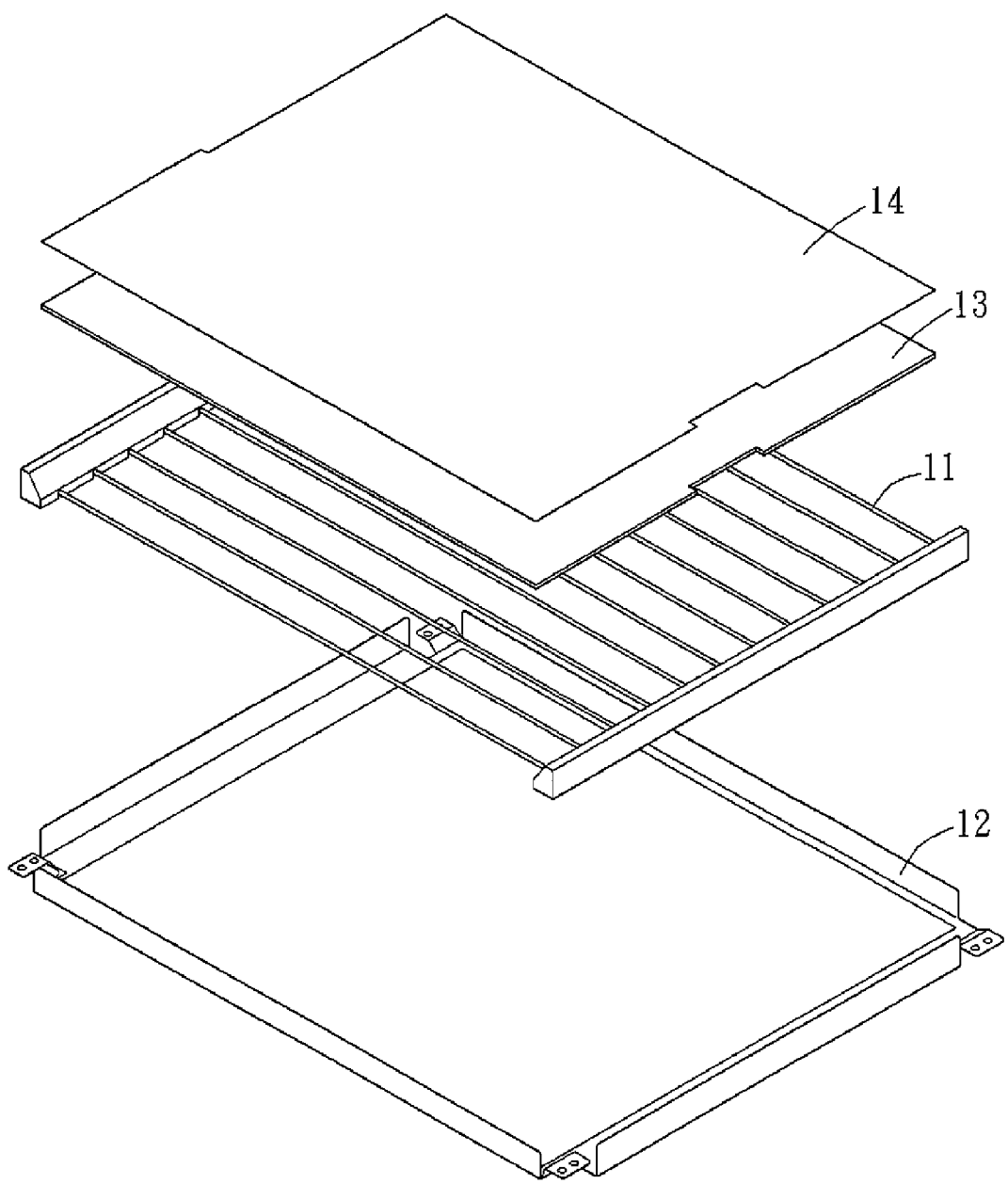
FIG. 1 is a schematic illustration of a conventional light-emitting module.
Figure 2:
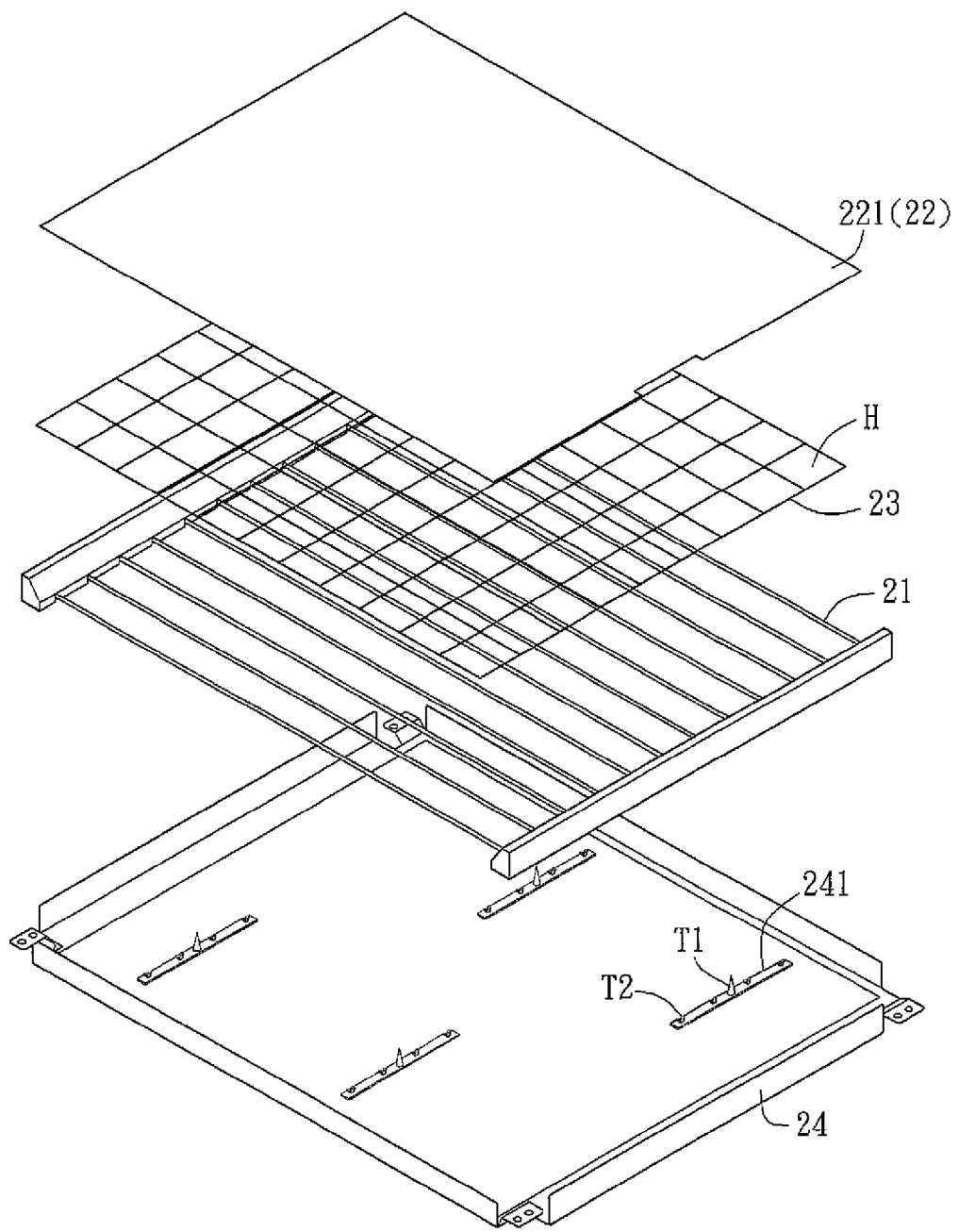
FIG. 2 is a schematic illustration of a light-emitting module according to a first embodiment of the invention.

With reference to FIG. 2, a light-emitting module 2 according to a first embodiment of the invention includes at least one light source 21, a diffusion unit 22 and a supporting unit 23. In the embodiment, the light-emitting module is, for example, a backlight module of an LCD device. Of course, the light-emitting module 2 can also be the light source of an illumination device, an advertising board or other electric devices.

The light source 21 can be a CCFL, an HCFL (hot cathode fluorescent lamp) or an LED (light-emitting diode). In the embodiment, the light source 21, for example, includes a plurality of CCFLs.

The diffusion unit 22 is disposed on the light source 21 and includes a first diffusion sheet 221.

The first diffusion sheet 221 will be described with reference to several aspects shown in FIGS. 3A to 3E.

The first diffusion sheet 221 includes a first substrate 221a and a first diffusion material 221b. The first substrate 221a can be made of polycarbonate (PC), polystyrene (PS), methyl methacrylate-styrene (MMA-St), polymethyl methacrylate (PMMA), or polyethylene terephthalate (PET). The first diffusion material 221b includes a plurality of first diffusion particles P, which can be made of an organic diffusion particle material such as polymethylmethacrylate (PMMA), polycarbonate (PC), polystyrene (PS), or methyl methacrylate-styrene (MS). The first diffusion material 221b can scatter light according to the refractive index difference and the shape of the diffusion particles. In the embodiment, the first diffusion particles P can be disposed on the first substrate 221a by a binder (not shown).

Figure 3A:
FIGS. 3A to 3E are schematic illustrations showing different aspects of the diffusion sheets of the invention.
Figure 3B:
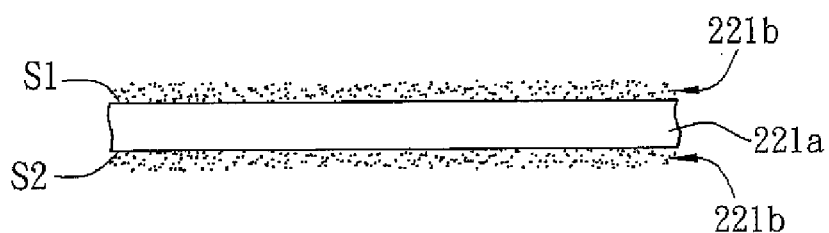

Referring to FIG. 3A, the first diffusion material 221b can be disposed on a first surface S1 or a second surface S2 of the first substrate 221a. Herein, the first surface S1 is disposed opposite to the second surface S2. In this aspect, the first diffusion material 221b is disposed on the first surface S1 for example. With reference to FIG. 3B, in another aspect, the first diffusion material 221b is disposed on both the first surface Si and the second surface S2. To be noted, the first diffusion material 221b has substantially uniform thickness, which means that the thickness of the first diffusion material 221b can have very small thickness variation caused by, for example, material variation or manufacturing errors.

Figure 3C:
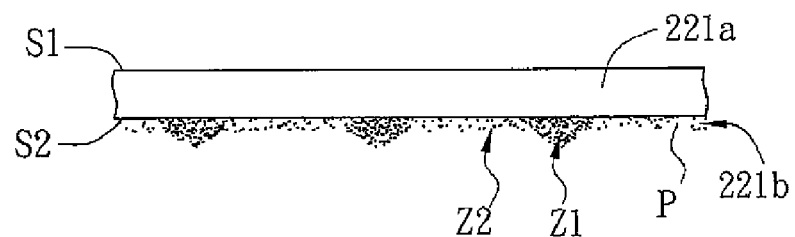
Figure 3D:
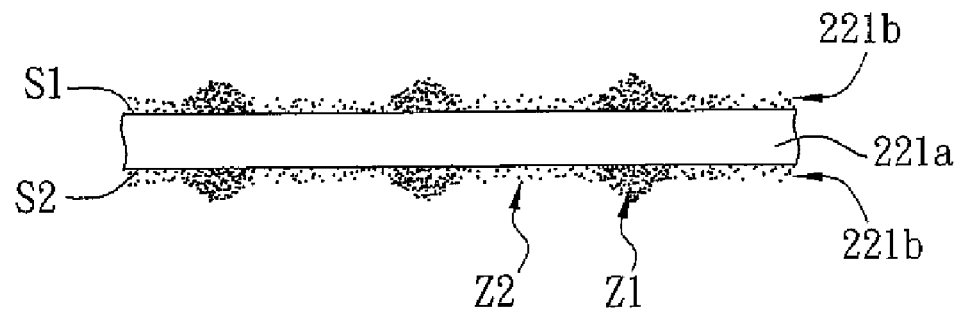

With reference to FIG. 3C, the first diffusion material 221b can be disposed on the first surface S1 or the second surface S2 and include at least one high-density area Z1 and at least one low-density area Z2. In the embodiment, the first diffusion material 221b includes several high-density areas Z1 and several low-density areas Z2. As shown in FIG. 3C, the high-density areas Z1 and the low-density areas Z2 are alternately disposed. Each high-density area Z1 is located corresponding to the light source as shown in FIG. 2. Thus, the first diffusion sheet 221 can have improved diffusion effect to the light beam emitted from the light source, so that the bright fringes can be reduced. With reference to FIG. 3D, the first diffusion material 221b with the high-density areas Z1 and the low-density areas Z2 can be disposed on both the first surface S1 and the second surface S2 of the first substrate 221a.

Figure 3E:
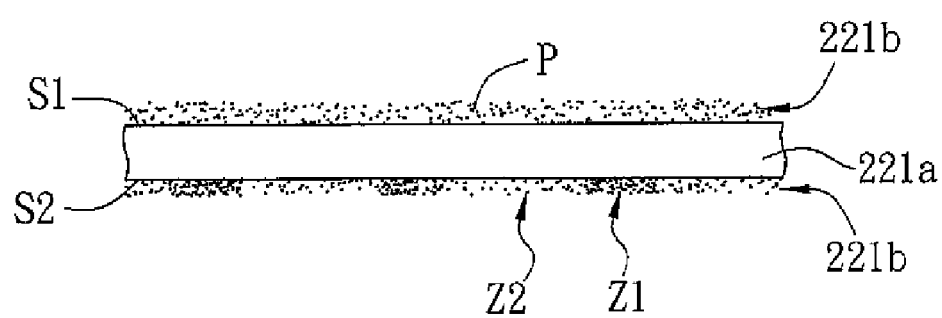

With reference to FIG. 3E, a first diffusion material 221b, which has a uniform thickness, is disposed on the first surface S1 of the first substrate 221a, and another first diffusion material 221b, which has several high-density areas Z1 and low-density areas Z2, is disposed on the second surface S2 of the first substrate 221a. The high-density areas Z1 and low-density areas Z2 are alternately disposed. To be noted, the high-density area Z1 contains higher density of the first diffusion particles P in the first diffusion material 221b, and it is unnecessary to have the convex shape.

With reference to FIG. 2, the supporting unit 23 is disposed between the light source 21 and the diffusion unit 22 for supporting the diffusion unit 22. In the embodiment, the supporting unit 23 is a net structure and has a plurality of holes H. The light beam is directly emitted from the light source 21 to the first diffusion sheet 221 through the holes H.

In addition, the light-emitting module 2 of the embodiment further includes a back plate 24. The light source 21 is disposed between the supporting unit 23 and the back plate 24. The back plate 24 includes a supporting member 241, which includes a protrusion T1 and a plurality of fixing portions T2. The fixing portions T2 can fasten the light source 21 so as to fix the lamps. The protrusion T1 can assist to support the diffusion unit 22 so as to prevent the partial non-planar of the diffusion unit 22, which may affect the light diffusing function thereof To be noted, the protrusion T1 may be disposed or not depending on the actual needs, As mentioned above, the invention utilizes the thinner first diffusion sheet 221 to form the diffusion unit 22, and uses the supporting unit 23 to support the diffusion unit 22 so as to keep the diffusion unit 22 planar. Thus, the material cost of the diffusion unit 22 can be reduced, and the light uniformity can be maintained. Moreover, the energy loss of the light beam emitted from the light source 21 can be decreased, so that the brightness of the outputted light of the light-emitting module 2 can be increased.

Second Embodiment

Figure 4:
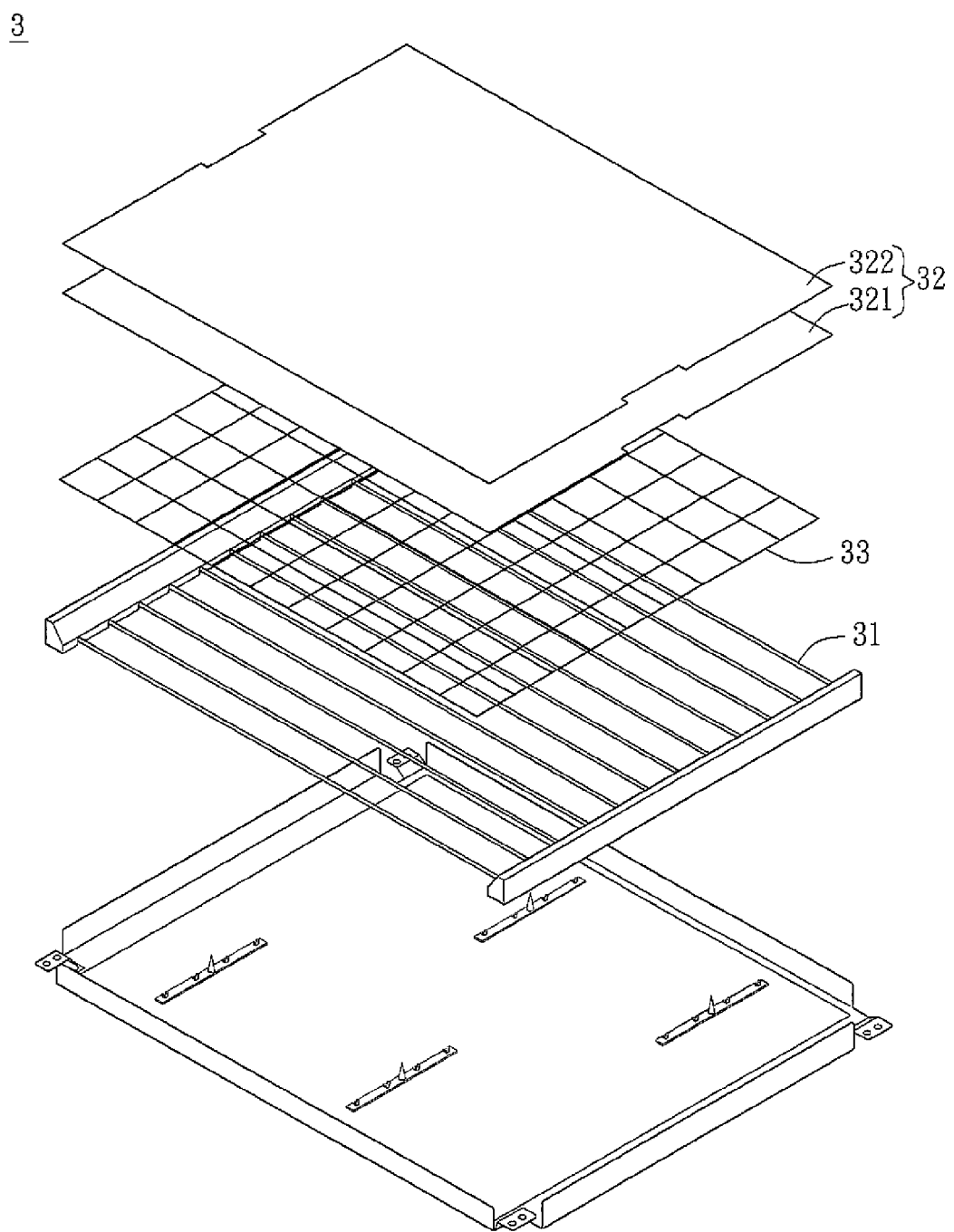
FIG. 4 is a schematic illustration of a light-emitting module according to a second embodiment of the invention.

With reference to FIG. 4, a light-emitting module 3 according to a second embodiment of the invention includes at least one light source 31, a diffusion unit 32 and a supporting unit 33. Herein, the features and functions of the light source 31 and the supporting unit 33 are the same as the light source 21 and the supporting unit 23 of the first embodiment, so the detailed descriptions thereof will be omitted.

The diffusion unit 32 is disposed on the light source 31. The difference between the first and second embodiments is in that the diffusion unit 32 includes a first diffusion sheet 321 and a second diffusion sheet 322. The thicknesses of the first diffusion sheet 321 and the second diffusion sheet 322 are both less than 1 mm. The second diffusion sheet 322 is disposed adjacent to the first diffusion sheet 321. The light beam is directly emitted from the light source 31 to the first diffusion sheet 321. The first diffusion sheet 321 and the second diffusion sheet 322 can be tightly adhered to each other by, for example, an adhesive.

In addition, the structures and compositions of the first diffusion sheet 321 and the second diffusion sheet 322 can be similar to those of the first diffusion sheet 221, including the aspects as shown in FIGS. 3A to 3E, so the detailed descriptions thereof are omitted. To be noted, the first diffusion sheet 321 and the second diffusion sheet 322 can, for example but not limited to, have the same aspect or different aspects.

Third Embodiment

Figure 5A:
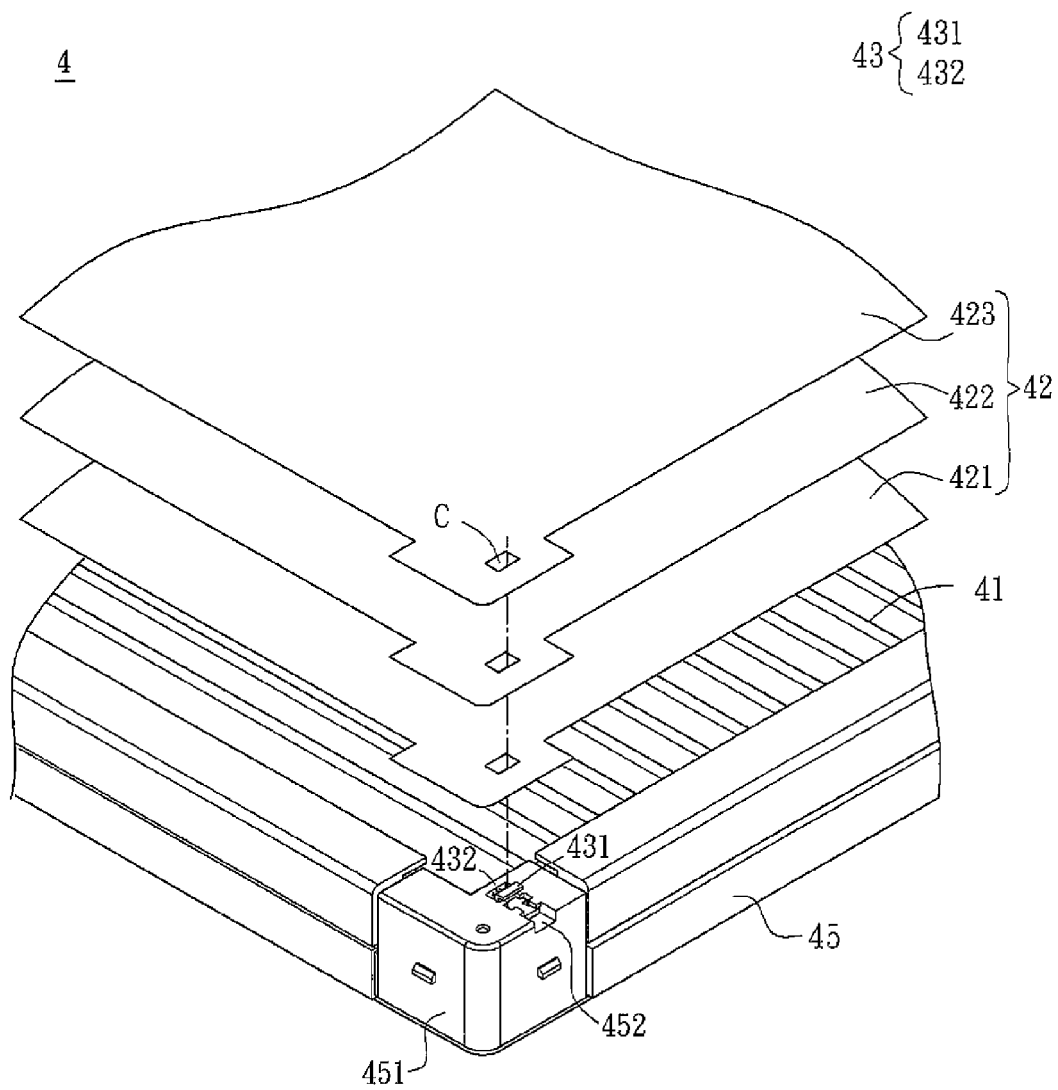
FIG. 5A is an exploded diagram of a light-emitting module according to a third embodiment of the invention.
Figure 5B:
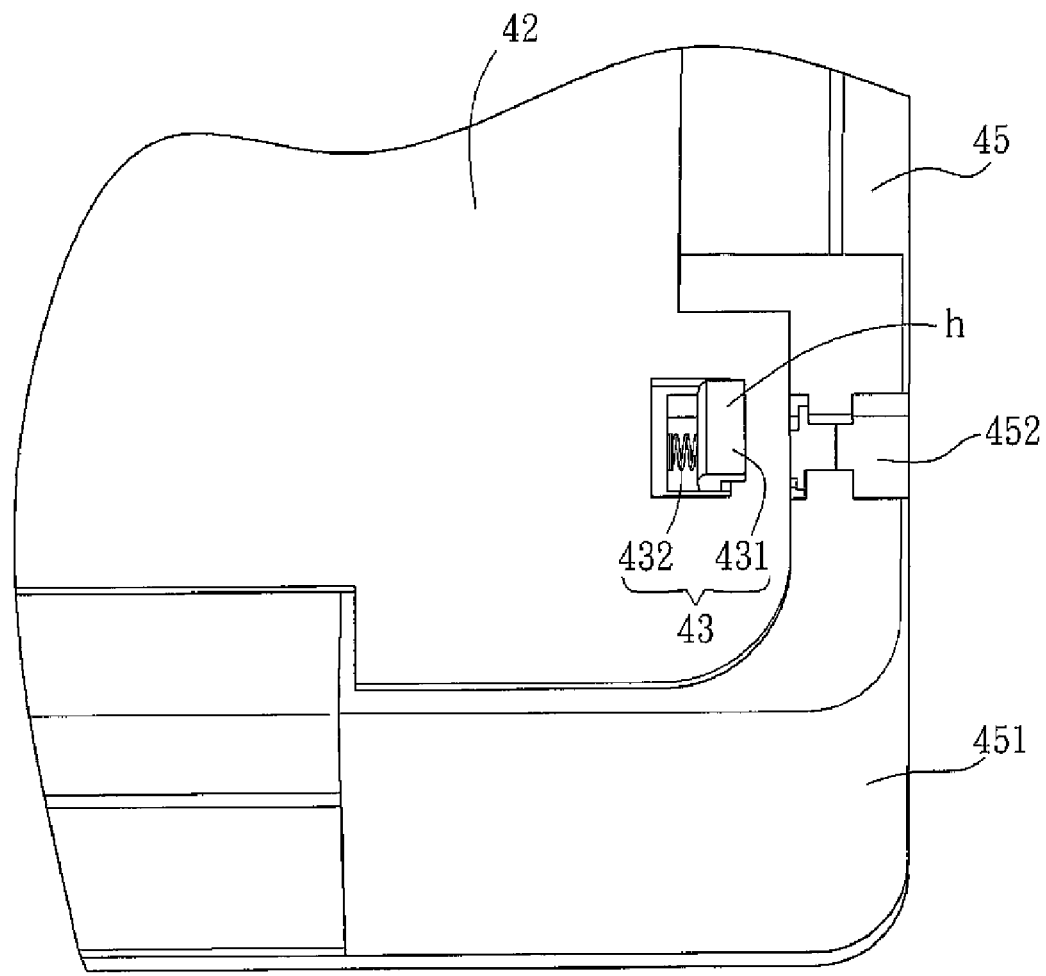
FIG. 5B is a schematic illustration of the assembled light-emitting module of FIG. 5A.

With reference to FIGS. 5A and 5B, a light-emitting module 4 according to a third embodiment of the invention includes at least one light source 41, a diffusion unit 42 and a supporting unit 43. Herein, the features and functions of the light source 41 are the same as the light source 31 of the second embodiment, so the detailed descriptions thereof will be omitted. The difference between the third and second embodiments is in that the light-emitting module 4 further includes a third diffusion sheet 423 and a frame body 45. The structure and composition of the third diffusion sheet 423 are similar to those of the first diffusion sheet 221 of the first embodiment, so the detailed descriptions thereof are omitted. To be noted, the number of the diffusion sheets in the diffusion unit 42 is not limited to the present embodiment and can be more for different requirements.

The frame body 45 can be made of, for example, metal or plastic, and it can be composed of several sub-frames. The connecting components 451 are disposed at the corners of the frame body 45, and each connecting components 451 has at least one recess 452. Alternatively, the frame body 45 can be integrally formed by plastic injection molding, and the recess 452 can be formed by metal stamping or plastic injection molding.

In addition, the optical sheets in the diffusion unit 42 can be tightly adhered to the supporting unit 43 as shown in the first embodiment. The supporting unit 43 may be embedded to or mounted to the diffusion sheets 421, 422 and 423. The supporting unit 43 may include at least one hooking element 431 and at least one elastic element 432. The hook element 431 extrudes from the recess 452, and one end of the elastic element 432 is connected to the hook element 431. In order to fix the diffusion unit 42 by the supporting unit 43, each of the diffusion sheets 421, 422 and 423 includes at least one combination hole C, which is located at the periphery thereof. Then, the diffusion sheets 421, 422 and 423 can be connected to the hook element 431 through the combination holes C.

The combination method of the diffusion sheets 421, 422 and 423 will be described herein below. Firstly, the hook element 431 is moved and a force is applied on the hook portion h continuously so as to connect the hook portion h and the diffusion sheets 421, 422, and 423. At this moment, the elastic element 432 is pushed by the hook element 432, so that it has a restoring force toward the outer edge of the frame body 45. Then, after the hook element 431 is connected to the diffusion sheets 421, 422 and 423, the force applied on the hook portion h is removed. Thus, the restoring force of the elastic element 432 can push the hook element 431 back to the initial position, thereby fixing the diffusion sheets 421, 422 and 423 and preventing the diffusion sheets 421, 422 and 423 from loosening out of the hook portion h. To be noted, FIGS. 5A and 5B show one aspect that the hook element 431 is disposed at one corner of the frame body 45, and, in practice, the hook element(s) 431 can be disposed at opposite two or four corners or any positions depending on the actual needs.

Fourth Embodiment

Figure 6:
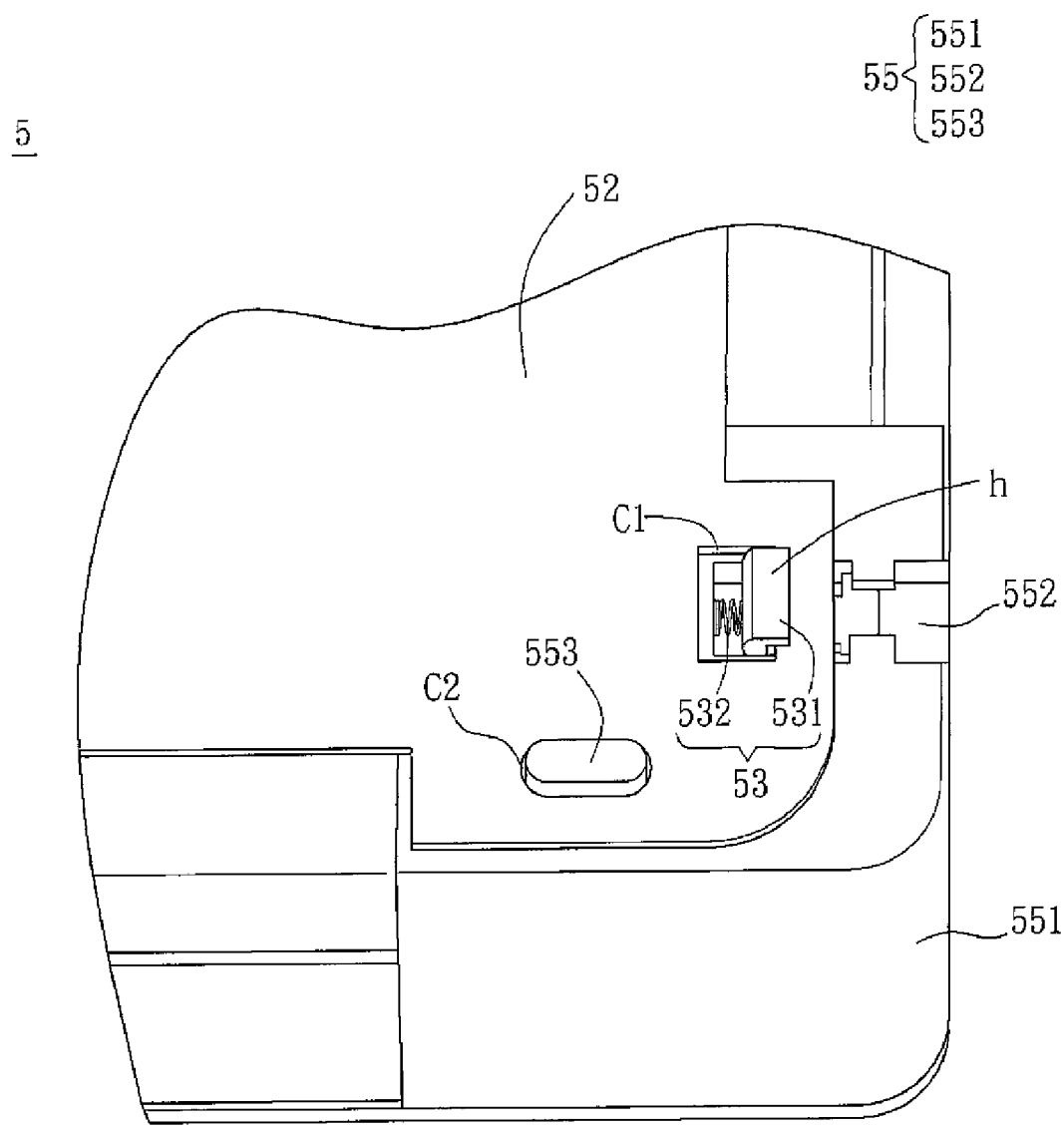
FIG. 6 is a schematic illustration of a light-emitting module according to a fourth embodiment of the invention.

With reference to FIG. 6, a light-emitting module 5 according to a fourth embodiment of the invention is different from that of the third embodiment in that the frame body 55 further includes a protrusion 553. The diffusion unit 52 has two corresponding combination holes C1 and C2, which are used to connect with the supporting unit 53 and the profusion 553, respectively. Accordingly, the fixing effect between the diffusion unit 52 and the frame body 55 can be enhanced.

In addition, the supporting unit 53 may have both the net structure and the hook element (not shown) depending on the actual needs.

With reference to FIG. 2 again, the invention also discloses a diffusion unit 22 of the light-emitting module 2. The diffusion unit 22 is disposed adjacent to at least one light source 21, which emits a light beam. The diffusion unit 22 includes a first diffusion sheet 221, which has a thickness less than 1 mm. The light beam is directly emitted from the light source 21 to the first diffusion sheet 221. The diffusion unit 22 has been described in the previous embodiment, so the detailed description thereof will be omitted.

With reference to FIGS. 3C to 3E, the invention further discloses a diffusion sheet 221 including a substrate 221*a* and a diffusion material 221*b*. The diffusion material 221*b* has at least one high-density area Z1 and at least one low-density area Z2. The diffusion sheet 221 has been described in the previous embodiment, so the detailed description thereof will be omitted.

In summary, the invention utilizes one or two diffusion sheets with the thickness less than 1 mm to form the diffusion unit. In addition, a supporting unit without the optical property is used to support the diffusion unit so as to keep the diffusion unit planar. Compared with the prior art, the invention uses the thinner diffusion sheet to form the diffusion unit, so that the material cost of the diffusion unit can be reduced. Moreover, the energy loss of the light beam after passing through the diffusion unit of the invention can be decreased, so that the brightness of the outputted light of the light-emitting module can be increased. In addition, the configuration of the high-low density areas in the diffusion material of the diffusion sheet can enhance the light diffusing effect of the diffusion unit.

Although the invention has been described with reference to specific embodiments, this description is not meant to be construed in a limiting sense. Various modifications of the disclosed embodiments, as well as alternative embodiments: will be apparent to persons skilled in the art. It is, therefore, contemplated that the appended claims will cover all modifications that fall within the true scope of the invention.

What is claimed is:

1. A light-emitting module, comprising:
   at lease one light source emitting a light beam;
   a diffusion unit comprising a first diffusion sheet and a second diffusion sheet, wherein thicknesses of the first diffusion sheet and the second diffusion sheet are less than 1 mm, the second diffusion sheet is disposed adjacent to the first diffusion sheet, and the light beam is directly emitted from the light source to the first diffusion sheet; and
   a supporting unit supporting the diffusion unit,
   wherein the supporting unit is a net structure and has a plurality of holes, and the light beam is emitted from the light source to the first diffusion sheet through the holes.

2. The light-emitting module according to claim 1, wherein the first diffusion sheet and the second diffusion sheet are tightly adhered to each other.

3. The light-emitting module according to claim 1, wherein the first diffusion sheet comprises a first substrate and a first diffusion material, and the second diffusion sheet comprises a second substrate and a second diffusion material.

4. The light-emitting module according to claim 3, wherein the first diffusion material is disposed on a first surface and/or a second surface of the first substrate, the first surface is opposite to the second surface, and the first diffusion material comprises at least one high-density area and at least one low-density area.

5. The light-emitting module according to claim 4, wherein the high-density areas and the low-density areas are alternately disposed.

6. The light-emitting module according to claim 3, wherein the second diffusion material is disposed on a third surface and/or a fourth surface of the second substrate, the third surface is opposite to the fourth surface, and the second diffusion material comprises at least one high-density area and at least one low-density area.

7. The light-emitting module according to claim 6, wherein the high-density areas and the low-density areas are alternately disposed.

8. The light-emitting module according to claim 1, further comprising:
   a third diffusion sheet, wherein the second diffusion sheet is disposed between the first diffusion sheet and the third diffusion sheet.

9. The light-emitting module according to claim 1, further comprising:
   a back plate, wherein the light source is disposed between the back plate and the supporting unit.

10. A light-emitting module, comprising:
    at lease one light source emitting a light beam;
    a diffusion unit comprising a first diffusion sheet and a second diffusion sheet, wherein thicknesses of the first diffusion sheet and the second diffusion sheet are less than 1 mm, the second diffusion sheet is disposed adjacent to the first diffusion sheet, and the light beam is directly emitted from the light source to the first diffusion sheet; and a supporting unit supporting the diffusion unit, wherein the supporting unit is a net structure and is tightly adhered to or embedded to the first diffusion sheet.

11. A light-emitting module, comprising:

at lease one light source emitting a light beam;

a diffusion unit comprising a first diffusion sheet and a second diffusion sheet, wherein thicknesses of the first diffusion sheet and the second diffusion sheet are less than 1 mm, the second diffusion sheet is disposed adjacent to the first diffusion sheet, and the light beam is directly emitted from the light source to the first diffusion sheet;

a supporting unit supporting the diffusion unit; and a frame body having at least one recess, wherein the supporting unit comprises at least one hook element and at least one elastic element, the hook element extrudes from the recess, and one end of the elastic element is connected to the hook element.

12. The light-emitting module according to claim 11, wherein the frame body is integrally formed.

13. The light-emitting module according to claim 11, wherein the frame body is formed by a plurality of sub-frames.

14. The light-emitting module according to claim 11, wherein the first diffusion sheet comprises at least one combination hole, and the hook element is connected with the combination hole.

15. The light-emitting module according to claim 14, wherein the combination hole is disposed at a periphery of the first diffusion sheet.

* * * * *